(12) United States Patent
Minagawa et al.

(10) Patent No.: US 11,537,121 B2
(45) Date of Patent: Dec. 27, 2022

(54) WORK VEHICLE, CONTROL DEVICE, AND METHOD FOR CONTROLLING WORK VEHICLE

(71) Applicant: Komatsu Ltd., Tokyo (JP)

(72) Inventors: Masanori Minagawa, Tokyo (JP); Jun Morinaga, Tokyo (JP); Yasuhiro Ohyama, Tokyo (JP); Qi Ding, Tokyo (JP)

(73) Assignee: Komatsu Ltd., Tokyo (JP)

( * ) Notice: Subject to any disclaimer, the term of this patent is extended or adjusted under 35 U.S.C. 154(b) by 82 days.

(21) Appl. No.: 16/609,281

(22) PCT Filed: Oct. 3, 2018

(86) PCT No.: PCT/JP2018/037014
§ 371 (c)(1),
(2) Date: Oct. 29, 2019

(87) PCT Pub. No.: WO2019/069974
PCT Pub. Date: Apr. 11, 2019

(65) Prior Publication Data
US 2020/0057437 A1    Feb. 20, 2020

(30) Foreign Application Priority Data
Oct. 4, 2017    (JP) .............................. JP2017-194127

(51) Int. Cl.
*G05D 1/00* (2006.01)
*B60W 50/02* (2012.01)
*G05D 1/02* (2020.01)

(52) U.S. Cl.
CPC ........... *G05D 1/0022* (2013.01); *B60W 50/02* (2013.01); *G05D 1/024* (2013.01); *G05D 1/0278* (2013.01)

(58) Field of Classification Search
CPC .... G05D 1/0022; G05D 1/024; G05D 1/0278; B60W 50/02
See application file for complete search history.

(56) References Cited

U.S. PATENT DOCUMENTS

2008/0046940 A1* 2/2008 Katayama .............. H04N 7/185
725/105
2013/0325244 A1* 12/2013 Wang ...................... G06T 11/00
701/26

(Continued)

FOREIGN PATENT DOCUMENTS

CN    103325240 A    9/2013
CN    103813161 A    5/2014

(Continued)

OTHER PUBLICATIONS

"Kazunori Hoshino, Video transmission system for remote control of construction machine, 2014" (Year: 2014).*

(Continued)

*Primary Examiner* — Nicholas Kiswanto
*Assistant Examiner* — Jamal A Shah
(74) *Attorney, Agent, or Firm* — Locke Lord LLP

(57) ABSTRACT

A work vehicle includes: an imaging device that captures an image in which a work target is shown; an image transmission unit that transmits the image captured by the imaging device to a control device; an operation signal reception unit that receives an operation signal from the control device; and an operation control unit that limits the operation signal according to a transmission status of the image.

3 Claims, 9 Drawing Sheets

(56) References Cited

U.S. PATENT DOCUMENTS

| | | | |
|---|---|---|---|
| 2014/0324249 A1* | 10/2014 | Lacaze | G05D 1/0038 |
| | | | 701/2 |
| 2015/0281028 A1 | 10/2015 | Akhter et al. | |
| 2016/0055384 A1 | 2/2016 | Yoo | |
| 2017/0293295 A1 | 10/2017 | Tani | |
| 2018/0097573 A1 | 4/2018 | Guo | |
| 2020/0325651 A1* | 10/2020 | Ono | E02F 3/7654 |

FOREIGN PATENT DOCUMENTS

| | | | |
|---|---|---|---|
| CN | 105383381 A | | 3/2016 |
| CN | 105741006 A | | 7/2016 |
| CN | 105843128 A | | 8/2016 |
| CN | 205754631 U | | 11/2016 |
| CN | 106210708 A | | 12/2016 |
| JP | 2006-285548 A | | 10/2006 |
| JP | 2009-154573 A | | 7/2009 |
| JP | 2011-043884 A | | 3/2011 |
| JP | 2011-085999 A | | 4/2011 |
| JP | 2011085999 A | * | 4/2011 |
| JP | 2012-142789 A | | 7/2012 |
| JP | 2013-168777 A | | 8/2013 |
| JP | 2016-018238 A | | 2/2016 |
| JP | 2016-071585 A | | 5/2016 |
| JP | 2016-072727 A | | 5/2016 |
| JP | 2016072727 A | * | 5/2016 |
| JP | 2017-022433 A | | 1/2017 |
| JP | 2017-080382 A | | 5/2017 |

OTHER PUBLICATIONS

Hiroaki Saito, Remote Control System, Oct. 13, 2009 (Year: 2009).*

* cited by examiner

WORK VEHICLE, CONTROL DEVICE, AND METHOD FOR CONTROLLING WORK VEHICLE

TECHNICAL FIELD

The present invention relates to a work vehicle that can be controlled by a remote operation, a control device that remotely operates the work vehicle, and a method for controlling the work vehicle.

Priority is claimed on Japanese Patent Application No. 2017-194127, filed on Oct. 4, 2017, the content of which is incorporated herein by reference.

BACKGROUND ART

PTL 1 discloses a technique of changing operation control of a vehicle that is a control target from normal control to safety control in a case where reception of a control signal is delayed due to deterioration of a communication state between a remote operation device and the vehicle that is the control target.

CITATION LIST

Patent Literature

[PTL 1] Japanese Unexamined Patent Application, First Publication No. 2016-71585

DISCLOSURE OF INVENTION

Technical Problem

On the other hand, even when the control signal is properly received, in a case where the image captured by the work vehicle cannot be properly displayed by the remote operation device, operability of the work vehicle may be degraded.

An object of the present invention is to provide a control device and a method for controlling a work vehicle based on a transmission status of the image.

Solution to Problem

According to a first aspect of the present invention, there is provided a work vehicle including: an imaging device that captures an image in which a work target is shown; an image transmission unit that transmits the image captured by the imaging device to a control device; an operation signal reception unit that receives an operation signal from the control device; and an operation control unit that limits the operation signal according to a transmission status of the image.

Advantageous Effects of Invention

With the work vehicle according to at least one aspect, it is possible to control the work vehicle based on the transmission status of the image.

BEST MODE FOR CARRYING OUT THE INVENTION

First Embodiment

<<Work System>>

Figure 1:
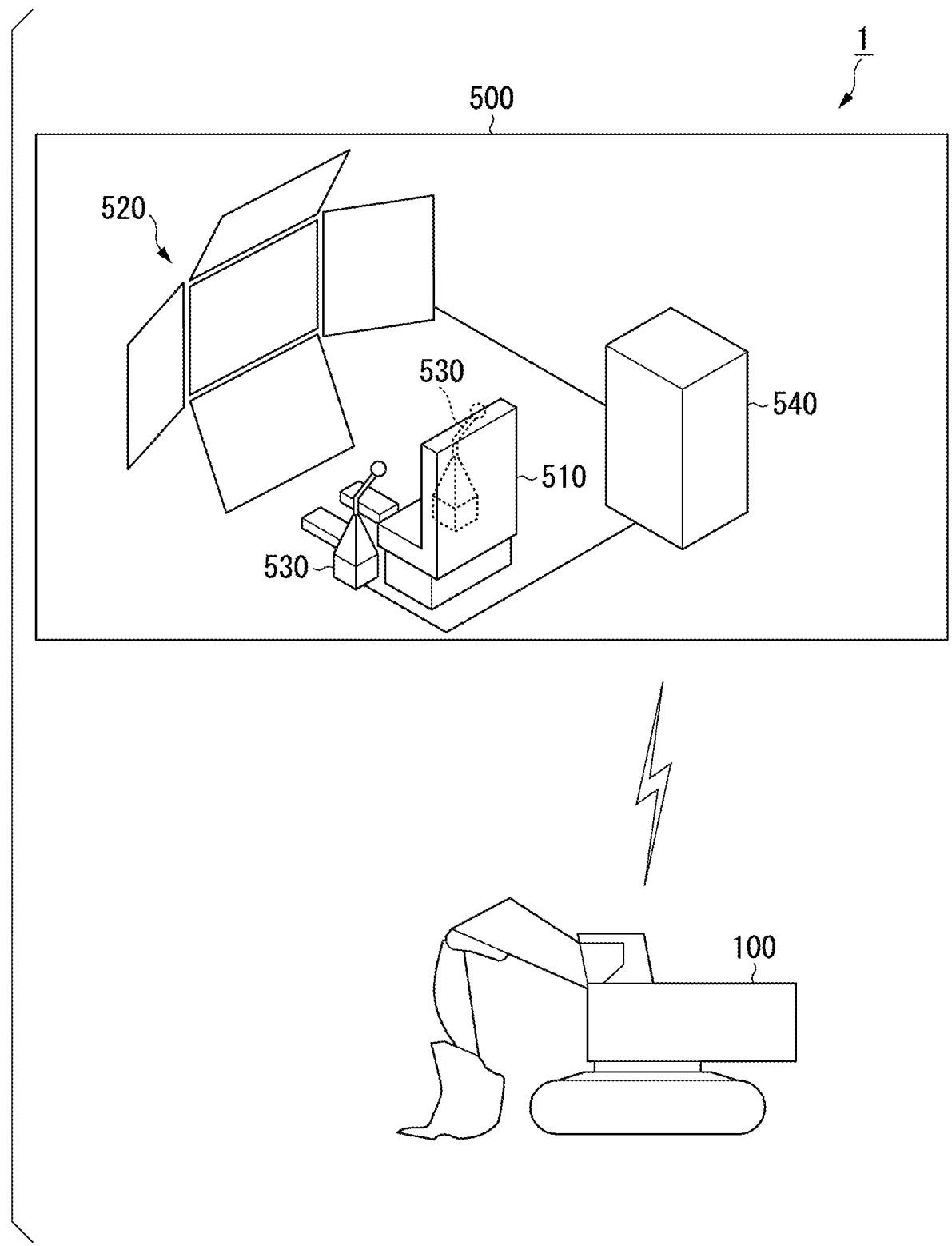
FIG. 1 is a schematic diagram illustrating a configuration of a work system according to a first embodiment.

FIG. 1 is a schematic diagram illustrating a configuration of a work system according to a first embodiment.

The work system 1 includes a work vehicle 100 that can be controlled by a remote operation and a remote operation room 500. The work vehicle 100 is provided at a work site (for example, a mine, a quarry, or the like). The remote operation room 500 is provided at a place away from the work vehicle 100 (for example, a city, an office at a work site, or the like). The work vehicle 100 and the remote operation room 500 are connected to each other via a network such as the Internet.

The work system 1 is a system for operating the work vehicle 100 using the remote operation room 500.

The work vehicle 100 operates according to an operation signal received from the remote operation room 500.

The remote operation room 500 receives an operation of the work vehicle 100 and transmits an operation signal to the work vehicle 100 according to an operation of an operator.

<<Work Vehicle>>

Figure 2:
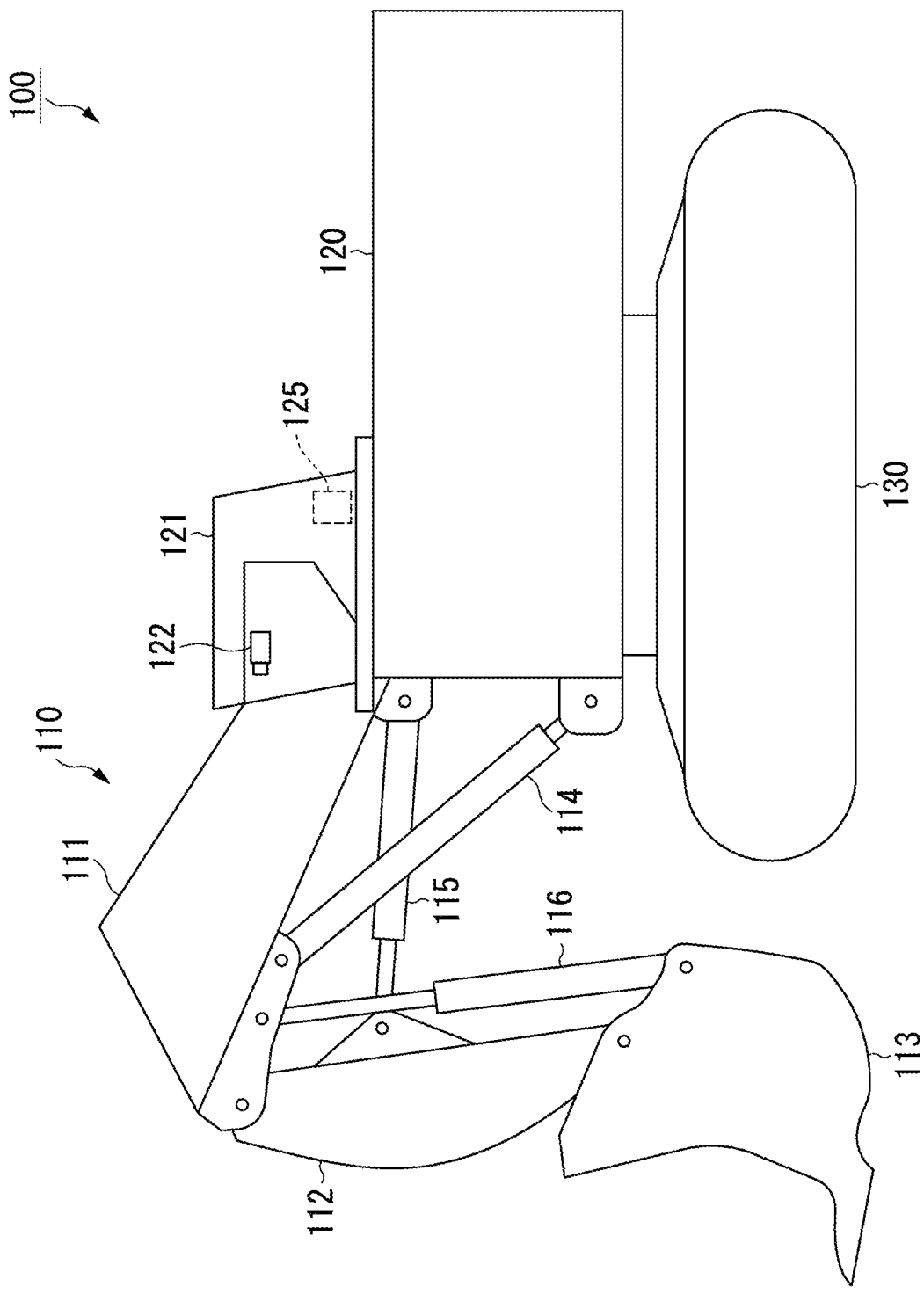
FIG. 2 is an external view of a work vehicle according to the first embodiment.

FIG. 2 is an external view of the work vehicle according to the first embodiment.

The work vehicle 100 according to the first embodiment is a hydraulic shovel. The work vehicle 100 according to another embodiment may be a work vehicle such as a bulldozer or a wheel loader instead of a hydraulic shovel.

The work vehicle 100 includes work equipment 110 that is operated by a hydraulic pressure, a swing body 120 that supports the work equipment 110, and a traveling body 130 that supports the swing body 120.

The work equipment 110 includes a boom 111, an arm 112, a bucket 113, a boom cylinder 114, an arm cylinder 115, and a bucket cylinder 116.

A base end portion of the boom 111 is attached to a front end portion of the swing body 120 via a pin.

The arm 112 connects the boom 111 and the bucket 113. A base end portion of the arm 112 is attached to a front end portion of the boom 111 via a pin.

The bucket 113 includes a blade for excavating earth and sand and a container for conveying the excavated earth and sand. A base end portion of the bucket 113 is attached to a front end portion of the arm 112 via a pin.

The boom cylinder 114 is a hydraulic cylinder for operating the boom 111. A base end portion of the boom cylinder 114 is attached to the swing body 120. A front end portion of the boom cylinder 114 is attached to the boom 111.

The arm cylinder 115 is a hydraulic cylinder for operating the arm 112. A base end portion of the arm cylinder 115 is attached to the swing body 120. A front end portion of the arm cylinder 115 is attached to the arm 112.

The bucket cylinder 116 is a hydraulic cylinder for operating the bucket 113. A base end portion of the bucket cylinder 116 is attached to the boom 111. A front end portion of the bucket cylinder 116 is attached to the bucket 113.

An operation room 121 is provided on the swing body 120. An imaging device 122 is provided at an upper portion of the operation room 121. The imaging device 122 is provided at a forward and upward portion in the operation room 121. The imaging device 122 captures an image (for example, a moving image) in front of the operation room 121 via a windshield at a front surface of the operation room 121. Examples of the imaging device 122 include, for example, an imaging device using a charge coupled device (CCD) sensor or a complementary metal oxide semiconductor (CMOS) sensor.

The work vehicle 100 includes a control device 125. The control device 125 operates the work equipment 110, the swing body 120, and the traveling body 130 based on the operation signal received from the remote operation room 500.

Figure 3:
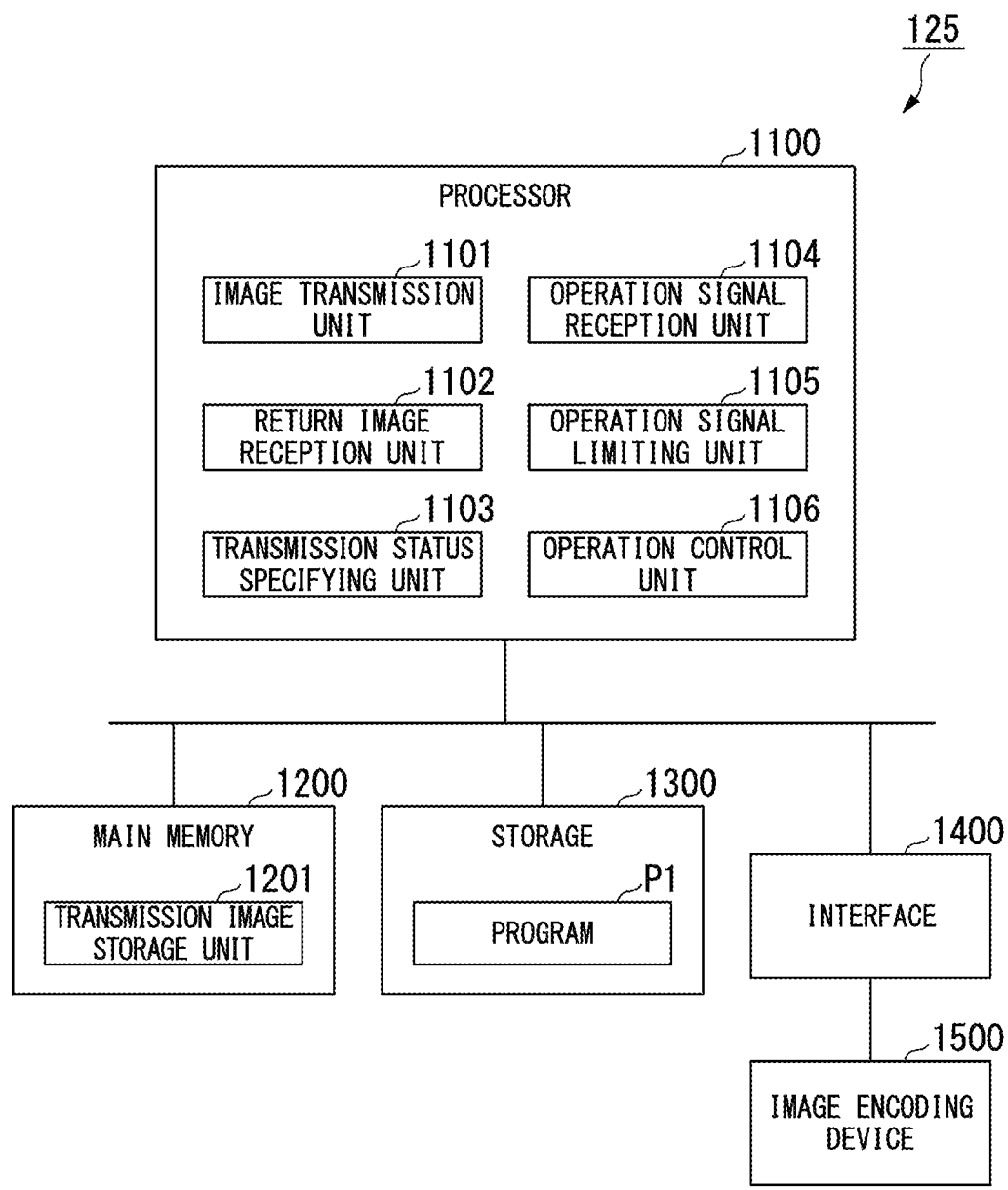
FIG. 3 is a schematic block diagram illustrating a configuration of a control device of the work vehicle according to the first embodiment.

FIG. 3 is a schematic block diagram illustrating a configuration of the control device of the work vehicle according to the first embodiment.

The control device 125 is a computer including a processor 1100, a main memory 1200, a storage 1300, an interface 1400, and an image encoding device 1500. The storage 1300 stores a program P1. The processor 1100 reads the program P1 from the storage 1300, develops the program P1 in the main memory 1200, and executes processing according to the program P1. The image encoding device 1500 is connected to the processor 1100 via the interface 1400, encodes (compresses) the image captured by the imaging device 122, and generates an encoded image. The control device 125 transmits the image to the remote operation room 500 via the interface 1400, and receives an operation signal from the remote operation room 500. The image encoding device 1500 may be provided separately from the control device 125.

The processor 1100 includes an image transmission unit 1101, a return image reception unit 1102, a transmission status specifying unit 1103, an operation signal reception unit 1104, an operation signal limiting unit 1105, and an operation control unit 1106 by execution of the program P1. In addition, the processor 1100 allocates a storage area of a transmission image storage unit 1201 in the main memory 1200 by the execution of the program P1.

The image transmission unit 1101 divides the encoded image, which is captured by the imaging device 122 and is encoded by the image encoding device 1500, into a plurality of packets, and transmits the packets to the remote operation room 500 according to a predetermined streaming protocol. The image transmission unit 1101 stores the encoded image which is transmitted in the transmission image storage unit 1201 in association with a transmission time of the last packet.

The return image reception unit 1102 receives, from the remote operation room 500, a packet which is returned in response to the packet transmitted by the image transmission unit 1101. The packet received by the return image reception unit 1102 is the same as the packet transmitted by the image transmission unit 1101.

The transmission status specifying unit 1103 reproduces an encoded image from the packets received by the return image reception unit 1102, and specifies a transmission status of the image based on the encoded image which is reproduced and the encoded image which is stored in the transmission image storage unit 1201. The transmission status specifying unit 1103 specifies the same encoded image as the encoded image which is received, by collating the encoded image which is reproduced from the received packets with the encoded image which is stored in the transmission image storage unit 1201. The transmission status specifying unit 1103 calculates a difference between the transmission time which is stored in the transmission image storage unit 1201 in association with the encoded image and a time when the encoded image is reproduced from the received packets (that is, a time when all packets of the encoded image are received), as a round-trip delay time of the image. The transmission status specifying unit 1103 calculates a one-way delay time of the image by dividing the round-trip delay time of the image by two. Here, the one-way delay time of the image is a delay time from when the image is captured by the imaging device 122 to when the image is displayed on a display device 520. The operator visually recognizes the image displayed on the display device 520 and performs a remote operation. For this reason, as the one-way delay time of the image is longer, the operability is degraded.

The one-way delay time of the image is equal to a one-way delay time of a single packet in a case where no packet loss occurs. On the other hand, in a case where retransmission of the packet is performed due to a packet loss or the like, as a communication environment becomes worse (an error rate becomes higher), the one-way delay time of the image becomes longer than a one-way delay time of a single packet. The one-way delay time of the image is information indicating the transmission status of the image.

The operation signal reception unit 1104 receives an operation signal from the remote operation room 500.

Figure 4:
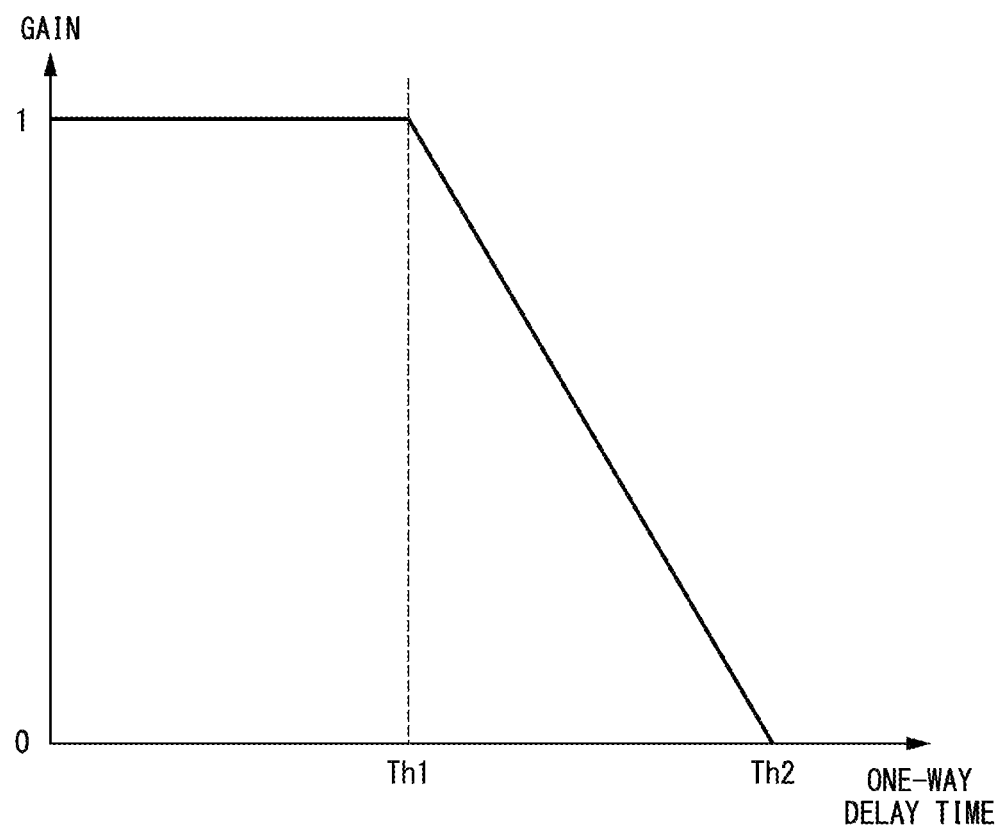
FIG. 4 is a diagram illustrating an example of a relationship between a one-way delay time of an image and a gain of an operation amount.

The operation signal limiting unit 1105 determines a gain of an operation amount of each of the work equipment 110 and the swing body 120 based on the one-way delay time of the image that is specified by the transmission status specifying unit 1103. FIG. 4 is a diagram illustrating an example of a relationship between the one-way delay time of the image and the gain of the operation amount. The gain of the operation amount is a value of 0 or more and 1 or less, and becomes smaller as the one-way delay time of the image becomes longer. In a case where the one-way delay time of the image is equal to or less than a first threshold value Th1 (for example, 0.5 seconds), the gain of the operation amount is 1. In a case where the one-way delay time of the image is equal to or more than a second threshold value Th2 (for example, one second), the gain of the operation amount is 0. In a case where the one-way delay time of the image is more than the first threshold value Th1 and less than the second threshold value Th2, the gain of the operation amount monotonically decreases with respect to the one-way delay time of the image. The operation signal limiting unit 1105 limits the operation amount by multiplying the operation amount indicated by the received operation signal by the specified gain. The relationship between the one-way delay time of the image and the gain of the operation amount is not limited to the relationship illustrated in FIG. 4. For example, in a case where the one-way delay time of the image is more than the first threshold value Th1 and less than the second threshold value Th2, the relationship between the one-way delay time of the image and the gain of the operation amount may not be a linear change as illustrated in FIG. 4, or may be a curvilinear change. In a case where the one-way delay time of the image is equal to or more than the second threshold value Th2, the operation signal limiting unit 1105 according to the present embodiment stops operations of the work equipment 110, the swing body 120, and the traveling body 130 by setting the gain to 0; however, the present invention is not limited thereto. For example, in another embodiment, in a case where the one-way delay time of the image is equal to or more than the second threshold value Th2, the operation signal limiting unit 1105 may stop operations of the work equipment 110, the swing body 120, and the traveling body 130 by another means for outputting a stop signal or stopping the output of the operation signal.

The operation control unit 1106 operates the work equipment 110, the swing body 120, and the traveling body 130 according to the operation amount obtained by multiplying the gain by the operation signal limiting unit 1105.

<<Remote Operation Room>>

The remote operation room 500 includes a driver's seat 510, a display device 520, an operation device 530, and a control device 540.

The display device 520 is disposed in front of the driver's seat 510. The display device 520 is located in front of the operator's eyes when the operator sits on the driver's seat 510. The display device 520 may be configured with a plurality of displays arranged side by side as illustrated in FIG. 1, or may be configured with one large display. Further, the display device 520 may be a device that projects an image on a curved surface or a spherical surface by a projector or the like.

The operation device 530 is disposed in the vicinity of the driver's seat 510. The operation device 530 is located within an operable range of the operator when the operator sits on the driver's seat 510.

The control device 540 causes the display device 520 to display the image received from the work vehicle 100. Further, the control device 540 transmits an operation signal representing an operation of the operation device 530, to the work vehicle 100.

Figure 5:
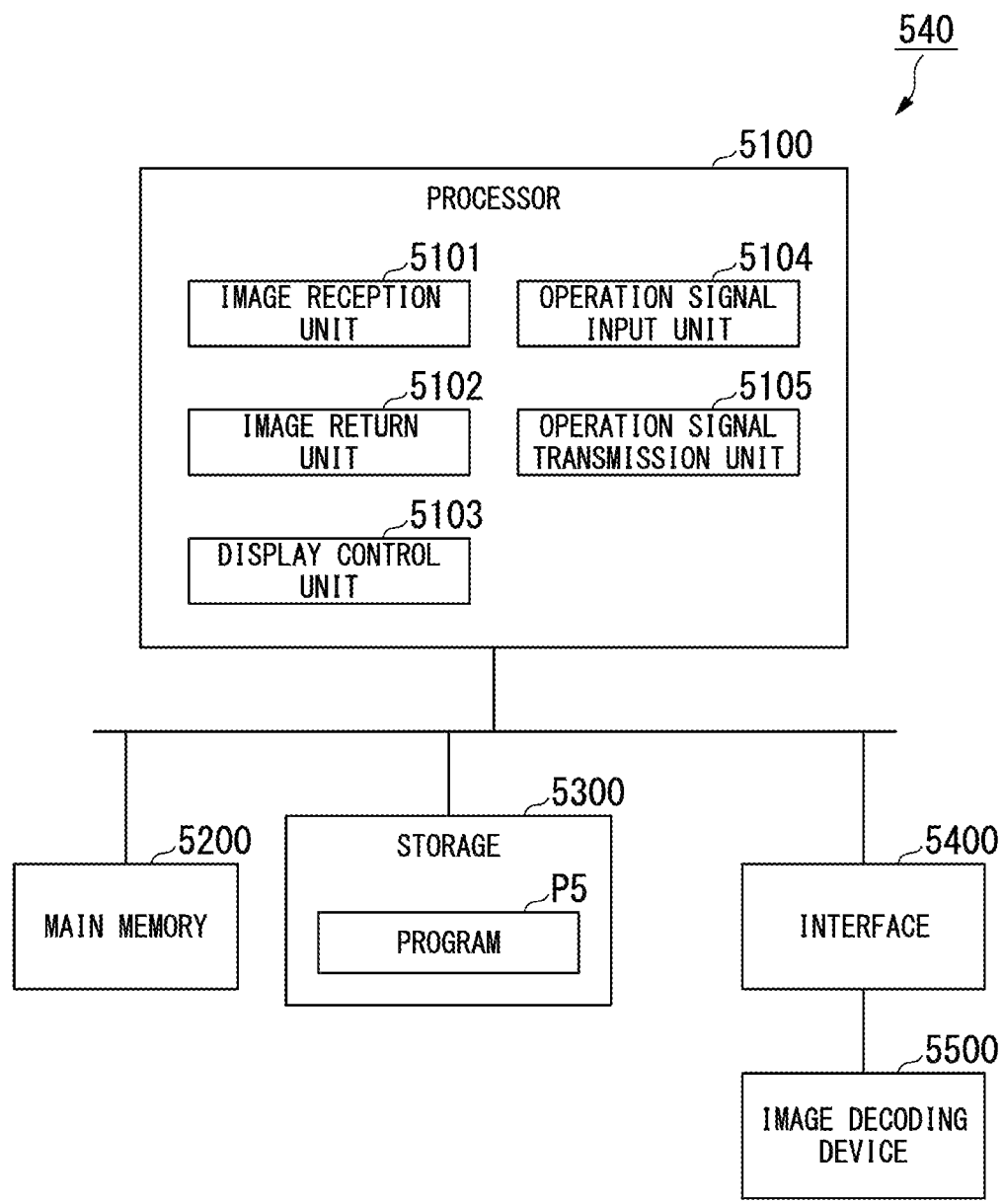
FIG. 5 is a schematic block diagram illustrating a configuration of a control device of a remote operation room according to the first embodiment.

FIG. 5 is a schematic block diagram illustrating a configuration of the control device of the remote operation room according to the first embodiment.

The control device 540 is a computer including a processor 5100, a main memory 5200, a storage 5300, an interface 5400, and an image decoding device 5500. The storage 5300 stores a program P5. The processor 5100 reads the program P5 from the storage 5300, develops the program P5 in the main memory 5200, and executes processing according to the program P5. The control device 540 is connected to the display device 520 and the operation device 530 via the interface 5400. Further, the control device 540 receives an image from the work vehicle 100 via the interface 5400, and transmits an operation signal to the work vehicle 100. The image decoding device 5500 is connected to the processor 5100 via the interface 5400. The image decoding device 5500 reproduces an original image by decoding the encoded image.

The processor 5100 includes an image reception unit 5101, an image return unit 5102, a display control unit 5103, an operation signal input unit 5104, and an operation signal transmission unit 5105 by an execution of the program P5.

The image reception unit 5101 receives, from the work vehicle 100, a packet in which the encoded image divided according to a predetermined streaming protocol is stored.

The image return unit 5102 returns the received packet to the work vehicle 100 as it is.

The display control unit 5103 reproduces the encoded image from the received packet, and causes the image decoding device 5500 to decode the encoded image. The display control unit 5103 causes the display device 520 to display the image decoded by the image decoding device 5500.

The operation signal input unit 5104 receives an input of an operation signal from the operation device 530.

The operation signal transmission unit 5105 transmits the input operation signal to the work vehicle 100.

«Method»

Figure 6:
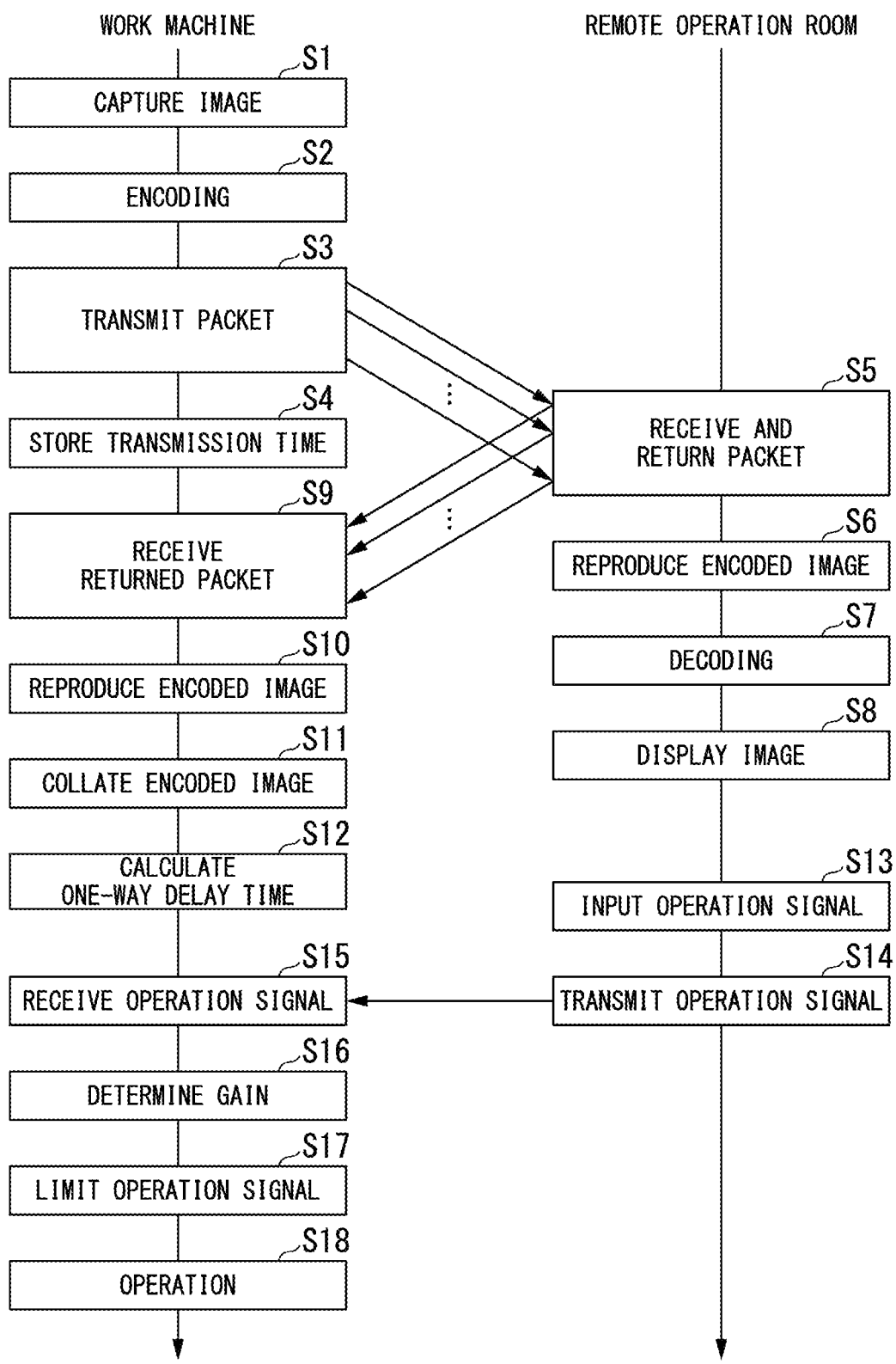
FIG. 6 is a sequence diagram illustrating an operation of the work system according to the first embodiment.

FIG. 6 is a sequence diagram illustrating an operation of the work system according to the first embodiment.

In the work vehicle 100, when the imaging device 122 captures an image (step S1), the image encoding device 1500 encodes the image, and thereby generates an encoded image (step S2). The image transmission unit 1101 divides the encoded image into a plurality of packets, and sequentially transmits each packet to the remote operation room 500 (step S3). When all the packets corresponding to one encoded image are transmitted, the image transmission unit 1101 stores a transmission time of the last packet in the transmission image storage unit 1201 in association with the encoded image (step S4).

In the remote operation room 500, the image reception unit 5101 receives the plurality of packets corresponding to the encoded image from the work vehicle 100, and the image return unit 5102 sequentially returns the packets to the work vehicle 100 as soon as each packet is received (step S5). When all the packets corresponding to the encoded image are received, the display control unit 5103 reproduces the encoded image (step S6). The display control unit 5103 causes the image decoding device 5500 to decode the encoded image which is reproduced (step S7). When the image decoding device 5500 decodes the encoded image, the display control unit 5103 causes the display device 520 to display the decoded image (step S8).

In the work vehicle 100, the return image reception unit 1102 receives the plurality of packets returned by the remote operation room 500 in step S5 (step S9). When all the packets corresponding to the encoded image are received, the transmission status specifying unit 1103 reproduces the encoded image (step S10). The transmission status specifying unit 1103 specifies the transmission time of the encoded image by collating the encoded image stored in the transmission image storage unit 1201 with the encoded image reproduced in step S10 (step S11). The transmission status specifying unit 1103 calculates a one-way delay time of the image by dividing a difference between the specified transmission time and the time when the encoded image is reproduced in step S10 (a round-trip delay time of the image) by two (step S12). At this time, the transmission status specifying unit 1103 may calculate the one-way delay time of the image by subtracting a time taken from reception of the image to return of the image in the remote operation room 500, from the round-trip delay time of the image.

Thereafter, when the operator operates the operation device 530, the operation signal input unit 5104 receives an input of an operation signal from the operation device 530 (step S13). The operation signal transmission unit 5105 transmits the input operation signal to the work vehicle 100 (step S14).

In the work vehicle 100, when the operation signal reception unit 1104 receives the operation signal from the remote operation room 500 (step S15), the operation signal limiting unit 1105 determines a gain of an operation amount based on the one-way delay time of the image that is specified by the transmission status specifying unit 1103 (step S16). As illustrated in FIG. 4, when the one-way delay time of the image is equal to or less than the first threshold value Th1, the gain is determined as 1, when the one-way delay time of the image is equal to or more than the second threshold value Th2, the gain is determined as 0, and when the one-way delay time of the image is more than the first threshold value Th1 and less than the second threshold value Th2, the gain monotonically decreases with respect to the one-way delay time of the image.

The operation signal limiting unit 1105 limits an operation amount of the operation signal by multiplying the operation amount indicated by the operation signal received by the operation signal reception unit 1104 by the determined gain (step S17). The operation control unit 1106 operates the work equipment 110, the swing body 120, and the traveling body 130 according to the operation amount calculated by the operation signal limiting unit 1105 (step S18). A flow from step S1 to step S12 and a flow from step S13 to step S18 are executed independently. That is, the procedure described in the sequence diagram of FIG. 6 is merely an example, and may not necessarily be executed in the order described above.

<<Operation and Effect>>

According to the first embodiment, the work vehicle 100 limits the operation signal received from the remote operation room 500 according to the transmission status of the image captured by the imaging device 122. Thereby, the work vehicle 100 according to the first embodiment can control the operation based on the transmission status of the image. Since the image has a large amount of data, a delay due to a packet loss or the like is likely to occur compared to an operation signal or a PING signal. Therefore, the work vehicle 100 according to the first embodiment can compensate for an influence of the delay of the image in a case where the image captured by the work vehicle 100 cannot be properly displayed in the remote operation room 500, by limiting the operation signal based on the transmission status of the image. That is, according to the work vehicle 100 of the first embodiment, the operator can remotely operate the work vehicle 100 without considering the influence of the delay of the image.

Second Embodiment

In the work system 1 according to the first embodiment, the work vehicle 100 limits a control signal received from the remote operation room 500 based on the transmission status of the image. On the other hand, in the work system 1 according to a second embodiment, the remote operation room 500 transmits a control signal which is limited based on the transmission status of the image, to the work vehicle 100.

<<Work Vehicle>>

Figure 7:
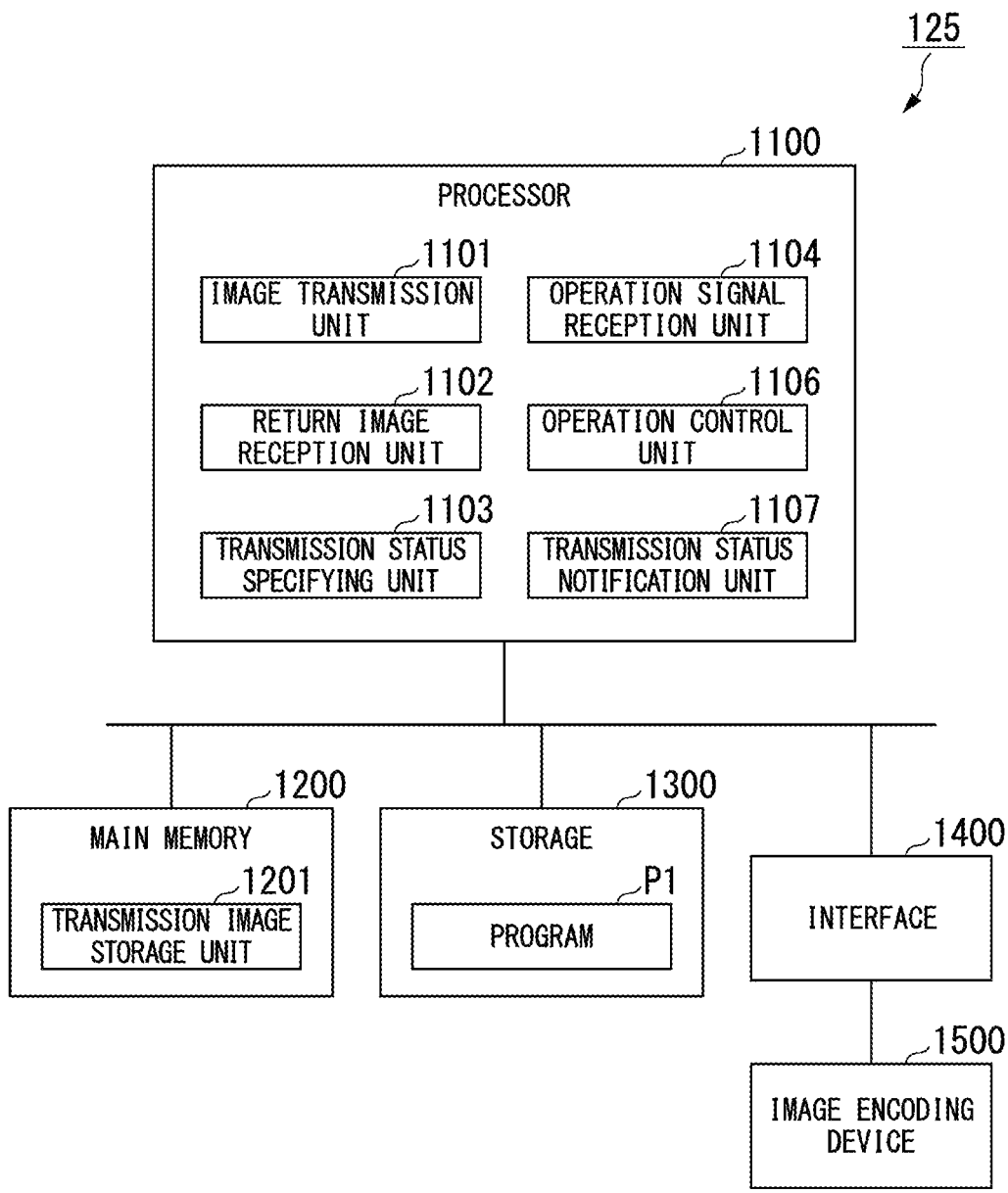
FIG. 7 is a schematic block diagram illustrating a configuration of the control device of the work vehicle according to a second embodiment.

FIG. 7 is a schematic block diagram illustrating a configuration of the control device of the work vehicle according to a second embodiment.

The control device 125 according to the second embodiment further includes a transmission status notification unit 1107 in addition to the configuration of the control device 125 according to the first embodiment, and does not include the operation signal limiting unit 1105.

The transmission status notification unit 1107 transmits the one-way delay time of the image that is specified by the transmission status specifying unit 1103, to the remote operation room 500.

<<Remote Operation Room>>

Figure 8:
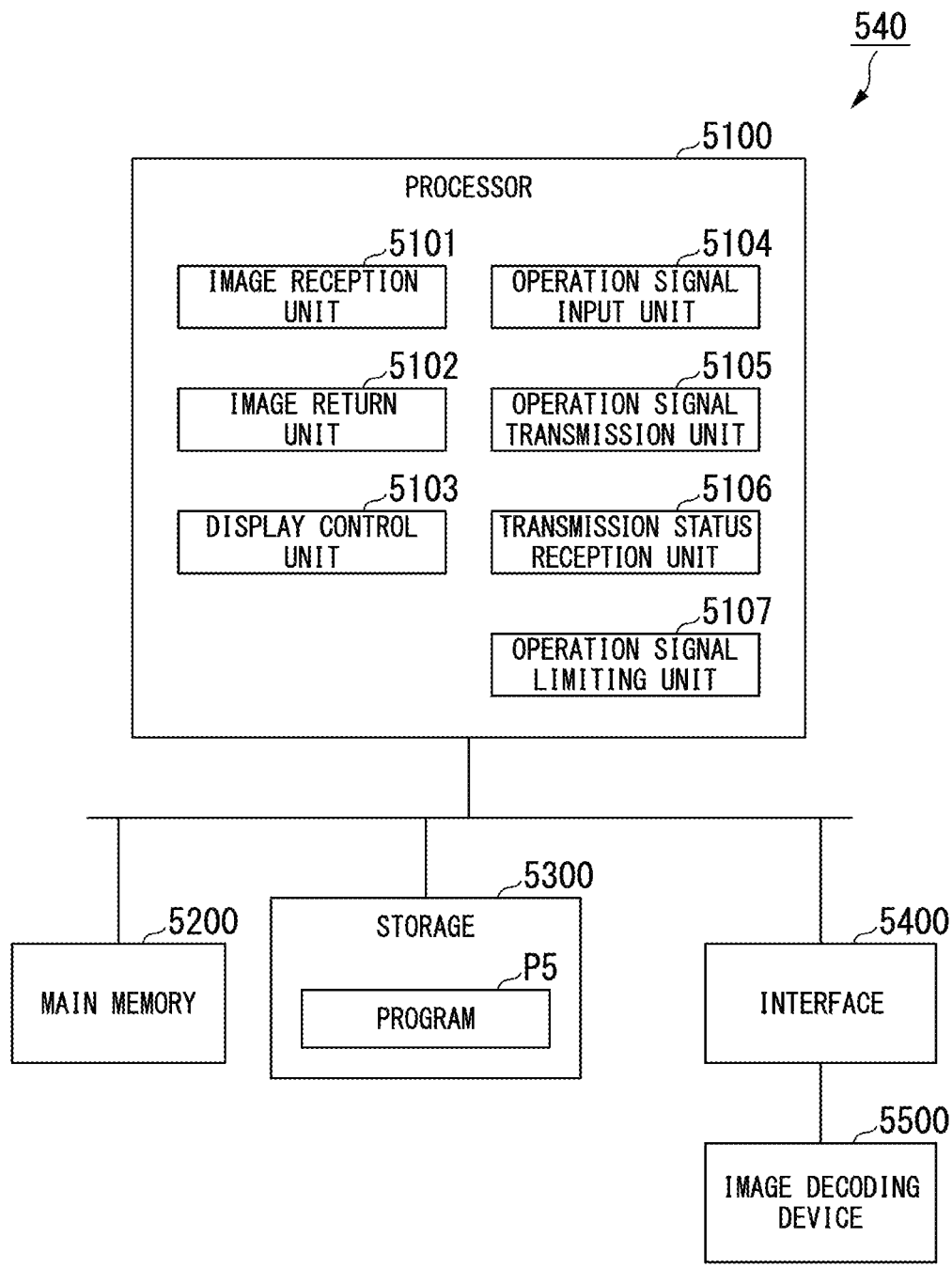
FIG. 8 is a schematic block diagram illustrating a configuration of the control device of the remote operation room according to the second embodiment.

FIG. 8 is a schematic block diagram illustrating a configuration of the control device of the remote operation room according to the second embodiment.

The control device 540 according to the second embodiment further includes a transmission status reception unit 5106 and an operation signal limiting unit 5107 in addition to the configuration of the control device 540 according to the first embodiment.

The transmission status reception unit 5106 receives the one-way delay time of the image from the work vehicle 100.

The operation signal limiting unit 5107 determines a gain of an operation amount illustrated in FIG. 4 based on the one-way delay time of the image that is received by the transmission status reception unit 5106. The operation signal limiting unit 5107 limits the operation amount by multiplying the operation amount indicated by the operation signal which is input to the operation signal input unit 5104 by the specified gain.

Figure 9:
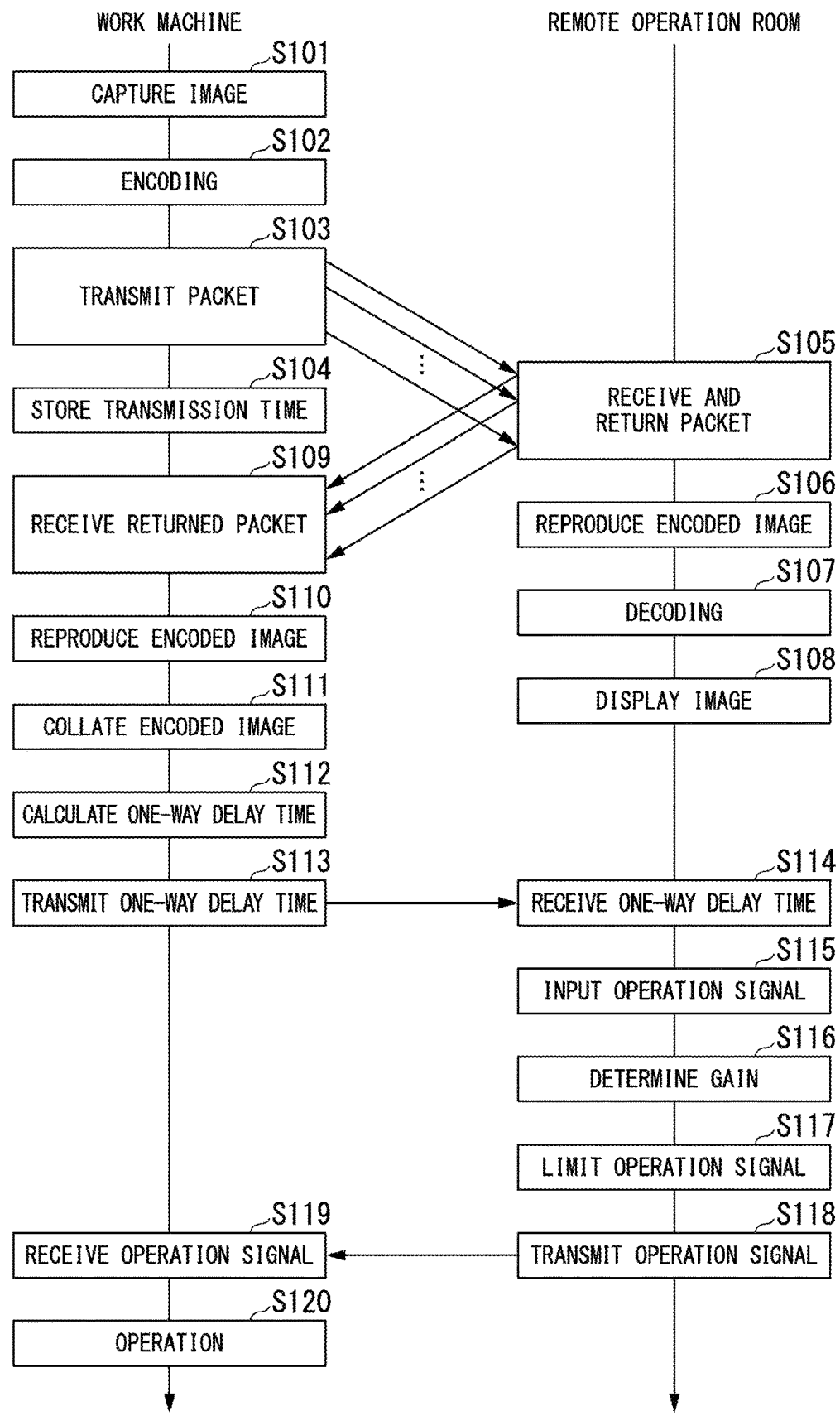
FIG. 9 is a sequence diagram illustrating an operation of the work system according to the second embodiment.

FIG. 9 is a sequence diagram illustrating an operation of the work system according to the second embodiment.

When the imaging device 122 of the work vehicle 100 captures an image, by processing from step S101 to step S112, the display device 520 of the remote operation room 500 displays the image, and the control device 125 of the work vehicle 100 calculates the one-way delay time of the image. The processing from step S101 to step S112 is the same as the processing from step S1 to step S12 according to the first embodiment.

When the transmission status specifying unit 1103 calculates the one-way delay time of the image, the transmission status notification unit 1107 transmits the calculated one-way delay time to the remote operation room 500 (step S113). The transmission status reception unit 5106 of the remote operation room 500 receives the one-way delay time of the image from the work vehicle 100 (step S114).

Thereafter, when the operator operates the operation device 530, the operation signal input unit 5104 receives an input of an operation signal from the operation device 530 (step S115). The operation signal limiting unit 5107 determines a gain of an operation amount based on the one-way delay time of the image that is received by the transmission status reception unit 5106 (step S116). As illustrated in FIG. 4, when the one-way delay time of the image is equal to or less than the first threshold value Th1, the gain is determined as 1, when the one-way delay time of the image is equal to or more than the second threshold value Th2, the gain is determined as 0, and when the one-way delay time of the image is more than the first threshold value Th1 and less than the second threshold value Th2, the gain monotonically decreases with respect to the one-way delay time of the image.

The operation signal limiting unit 5107 limits an operation amount of the operation signal by multiplying the operation amount indicated by the operation signal which is input to the operation signal input unit 5104 by the determined gain (step S117). The operation signal transmission unit 5105 transmits the limited operation signal to the work vehicle 100 (step S118).

When the operation signal reception unit 1104 of the work vehicle 100 receives the operation signal from the remote operation room 500 (step S119), the operation control unit 1106 operates the work equipment 110, the swing body 120, and the traveling body 130 according to the operation amount received by the operation signal reception unit 1104 (step S120).

<<Operation and Effect>>

According to the second embodiment, the remote operation room 500 limits the operation signal according to the transmission status of the image captured by the imaging device 122, and transmits the limited operation signal to the work vehicle 100. Thereby, the remote operation room 500 according to the second embodiment can control the operation of the work vehicle 100 based on the transmission status of the image.

Other Embodiments

Although embodiments have been described in detail above with reference to the drawings, a specific configuration is not limited to the embodiments, and various design changes may be made.

For example, although the control device 125 of the work vehicle 100 specifies the one-way delay time of the image in the work system 1 according to the above-described embodiment, the present invention is not limited to this configuration. For example, in the work system 1 according to another embodiment, the control device 540 of the remote operation room 500 may specify the one-way delay time of the image. For example, the control device 540 may receive the encoded image including the transmission time from the work vehicle 100, and may specify a time difference between a reception time of the image and the transmission time included in the image, as the one-way delay time of the image.

Further, although the control device 125 specifies the one-way delay time of the image as the transmission status in the above-described embodiment, the present invention is not limited thereto. For example, in the work system 1 according to another embodiment, the transmission status may be specified based on the round-trip delay time of the image, an error detection rate of the packets, the number of retransmissions of the packets, the number of lost packets, and the like. In addition, the work system 1 according to another embodiment may specify the one-way delay time based on the operation signal.

Further, although the work system 1 according to the above-described embodiment limits the operation amount by multiplying the operation amount indicated by the operation signal by the gain according to the one-way delay time of the image, the present invention is not limited thereto. For example, the work system 1 according to another embodiment may limit the operation amount by a limiter having an upper limit value according to the one-way delay time of the image. In addition, in the work system 1 according to another embodiment, the gain or the upper limit value may differ depending on the operation amount of the work equipment 110, the operation amount of the swing body 120, and the operation amount of the traveling body 130. In addition, in the work system 1 according to another embodiment, the gain or the upper limit value may differ depending on acceleration and deceleration.

Although the case where the program P1 is stored in the storage 1300 has been described for the control device 125 according to the above-described embodiment, the present invention is not limited thereto. For example, in another embodiment, the program P1 may be distributed to the control device 125 by a communication line. In this case, when the distributed program P1 is received, the control device 125 develops the program P1 in the main memory 1200, and executes the processing according to the program P1.

Further, although the control device 540 according to the above-described embodiment returns the packets corresponding to the image as soon as the packets are received, the present invention is not limited thereto. For example, the control device 540 according to another embodiment may reproduce the image based on the received packets, divide the image into a plurality of packets, and then transmit the packets to the work vehicle 100.

Further, the program P1 may be a program for realizing some of the above-described functions. For example, the program P1 may be a program for realizing the above-described functions in combination with another program already stored in the storage 1300 or another program embedded in another device.

Further, although the case where the program P5 is stored in the storage 5300 has been described for the control device 540 according to the above-described embodiment, the present invention is not limited thereto. For example, in another embodiment, the program P5 may be distributed to the control device 540 by a communication line. In this case, when the distributed program P5 is received, the control device 540 develops the program P5 in the main memory 5200, and executes the processing according to the program P5.

Further, the program P5 may be a program for realizing some of the above-described functions. For example, the program P5 may be a program for realizing the above-described functions in combination with another program already stored in the storage 5300 or another program embedded in another device.

Further, the control device 125 and the control device 540 may include a programmable logic device (PLD) in addition to or instead of the configuration. Examples of a PLD include a programmable array logic (PAL), a generic array logic (GAL), a complex programmable logic device (CPLD), and a field programmable gate array (FPGA). In this case, some of the functions realized by the processor may be realized by the PLD.

INDUSTRIAL APPLICABILITY

According to the work vehicle of the present invention, it is possible to control the work vehicle based on the transmission status of the image.

REFERENCE SIGNS LIST

1: Work System
100: Work vehicle
110: Work Equipment
120: Swing Body
122: Imaging Device
125: Control Device
1101: Image Transmission Unit
1102: Return Image Reception Unit
1103: Transmission Status Specifying Unit
1104: Operation Signal Reception Unit
1105: Operation Signal limiting Unit
1106: Operation Control Unit
1107: Transmission Status Notification Unit
1201: Transmission Image Storage Unit
130: Traveling Body
500: Remote Operation Room
520: Display Device

530: Operation Device
540: Control Device
510: Driver's Scat
5101: Image Reception Unit
5102: Image Return Unit
5103: Display Control Unit
5104: Operation Signal Input Unit
5105: Operation Signal Transmission Unit
5106: Transmission Status Reception Unit
5107: Operation Signal limiting Unit

The invention claimed is:

1. A work vehicle including a swing body that supports a work equipment comprising:
 an imaging device provided on the swing body that captures an image in which a work target is shown; and
 a processor that includes;
  an image transmission unit that transmits the image captured by the imaging device to a control device;
  an operation signal reception unit that receives an operation signal from the control device; and
  an operation control unit that limits an operation amount of the operation signal received according to a transmission status of the image:
  a return image reception unit that receives the image returned from the control device; and
  a transmission status specifying unit that specifies the transmission status based on the image transmitted by the image transmission unit and the image received by the return image reception unit,
  wherein the transmission status specifying unit specifies the transmission status based on a difference between a transmission time of the image and a reception time of the image.

2. A control device of a remote operation room comprising:
 a processor that includes;
  an image reception unit that receives an image from a work vehicle including an imaging device;
  a display unit that displays the image;
  an operation signal input unit that receives an input of an operation signal of the work vehicle; and
  an operation signal transmission unit that limits an operation amount of the operation signal according to a transmission status of the image and transmits the operation signal to the work vehicle:
  a return image reception unit that receives the image returned from the work vehicle; and
  a transmission status specifying unit that specifies the transmission status based on the image transmitted by the image transmission unit and the image received by the return image reception unit,
  wherein the transmission status specifying unit specifies the transmission status based on a difference between a transmission time of the image and a reception time of the image.

3. A method for controlling a work vehicle, the method comprising the steps of:
 capturing an image in which a work target is shown by the work vehicle;
 transmitting the captured image to a control device;
 receiving an operation signal from the control device;
 controlling the work vehicle by limiting an operation amount of the operation signal received according to a transmission status of the image;
 receiving the image returned from the control device; and
 specifying the transmission status based on the image transmitted and the image received,
 wherein the transmission status is based on a difference between a transmission time of the image and a reception time of the image.

* * * * *